United States Patent
Jang et al.

(10) Patent No.: US 12,418,043 B2
(45) Date of Patent: Sep. 16, 2025

(54) METHOD OF MANUFACTURING A SOLID ELECTROLYTE FOR AN ALL-SOLID-STATE BATTERY THROUGH LIQUID STIRRING

(71) Applicants: HYUNDAI MOTOR COMPANY, Seoul (KR); KIA CORPORATION, Seoul (KR)

(72) Inventors: Yong Jun Jang, Seongnam-si (KR); In Woo Song, Gwacheon-si (KR); Sun Ho Choi, Incheon (KR); Sa Heum Kim, Suwon-si (KR); Sang Heon Lee, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 690 days.

(21) Appl. No.: 17/538,902

(22) Filed: Nov. 30, 2021

(65) Prior Publication Data
US 2022/0246981 A1    Aug. 4, 2022

(30) Foreign Application Priority Data
Feb. 3, 2021 (KR) .......... 10-2021-0015135

(51) Int. Cl.
*H01M 10/0562* (2010.01)
*C01B 25/14* (2006.01)
*H01M 10/0525* (2010.01)

(52) U.S. Cl.
CPC ......... *H01M 10/0562* (2013.01); *C01B 25/14* (2013.01); *H01M 10/0525* (2013.01); *C01P 2002/72* (2013.01); *C01P 2006/40* (2013.01); *H01M 2300/0068* (2013.01)

(58) Field of Classification Search
CPC ......... H01M 10/0562; H01M 10/0525; H01M 2300/0068; H01M 10/052; H01M 4/382; H01M 2300/0085; C01B 25/14; C01P 2002/72; C01P 2006/40; C01D 15/00; B01J 8/10
See application file for complete search history.

(56) References Cited

U.S. PATENT DOCUMENTS

| | | |
|---|---|---|
| 10,290,896 B2 | 5/2019 | Sung et al. |
| 11,114,690 B2 | 9/2021 | Jang et al. |
| 2006/0035146 A1* | 2/2006 | Hayashi ............ H01M 10/0525 429/231.95 |
| 2018/0138544 A1 | 5/2018 | Sung et al. |

(Continued)

FOREIGN PATENT DOCUMENTS

KR    20180055086 A    5/2018

OTHER PUBLICATIONS

Sunho Choi, Application of Rod-Like Li6PS5CI Directly Synthesized by a Liquid Phase Process to Sheet Type Electrodes for All-Solid-State Lithium Batteries, 2019, J. Electrochem. Soc, 166 (3), A5193-A5200 (Year: 2019).*

(Continued)

*Primary Examiner* — Daniel C. McCracken
*Assistant Examiner* — Joshua Maxwell Speer
(74) *Attorney, Agent, or Firm* — Lempia Summerfield Katz LLC

(57) ABSTRACT

A method of manufacturing a solid electrolyte for an all-solid-state battery is provided by allowing a starting material to react through liquid stirring without pulverization.

9 Claims, 3 Drawing Sheets

| Preparing starting material including monomer lithium powder, monomer sulfur powder and phosphorus compound | S10 |
| Adding starting material to solvent and causing reaction with stirring | S20 |
| Drying reaction product | S30 |
| Heat-treating dried reaction product | S40 |

(56) References Cited

U.S. PATENT DOCUMENTS

| | | | |
|---|---|---|---|
| 2019/0115615 A1* | 4/2019 | Kwon | H01M 4/136 |
| 2019/0173127 A1* | 6/2019 | Jang | H01M 10/0562 |
| 2019/0190007 A1* | 6/2019 | Seong | H01M 10/052 |
| 2020/0119394 A1 | 4/2020 | Jang et al. | |
| 2020/0358132 A1* | 11/2020 | Yamada | H01M 10/0525 |

OTHER PUBLICATIONS

Yang Nachuan, Yuan Wangyu, Yuan Shuaiyi, Yuan Chen Kanghua, Preparation and performance study of low-cost sulfide solid electrolyte Li6-xPS5-xClx, Dec. 2020, Electrochem., 26(6), 885-889 (Year: 2020).*

* cited by examiner

METHOD OF MANUFACTURING A SOLID ELECTROLYTE FOR AN ALL-SOLID-STATE BATTERY THROUGH LIQUID STIRRING

CROSS REFERENCE TO RELATED APPLICATION

The present application claims priority based on Korean Patent Application No. 10-2021-0015135, filed on Feb. 3, 2021, the entire content of which is incorporated herein for all purposes by this reference.

BACKGROUND OF THE DISCLOSURE

1. Technical Field

The present disclosure relates to a method of manufacturing a solid electrolyte for an all-solid-state battery by allowing a starting material to react through liquid stirring without pulverization.

2. Description of the Related Art

Secondary batteries are used as high-performance energy sources for small portable electronic devices such as mobile phones, camcorders, laptop computers, and the like, and large-capacity power storage batteries such as electric vehicles, battery power storage systems, and the like. Research is underway on reducing the weight of parts and reducing power consumption with the aim of realizing miniaturization and continuous long-term use of portable electronic devices. Thus, secondary batteries that are small and capable of realizing high capacity are required.

Lithium-ion batteries as secondary batteries have higher energy density, higher capacity per unit area, a lower self-discharge rate, and a longer lifespan than nickel manganese batteries or nickel cadmium batteries. In addition, there is no memory effect, so they have the characteristics of ease of use and a long lifespan. However, as batteries for next-generation electric vehicles, lithium-ion batteries have various problems such as stability problems due to overheating, low energy density, and low power output.

In particular, the stability problem caused by the liquid electrolyte may lead to an accident that causes a fire. In order to overcome the problems with lithium-ion batteries using the liquid electrolyte, extensive research and development into an all-solid-state lithium-ion battery using a solid electrolyte continues.

The all-solid-state lithium-ion battery uses a solid electrolyte and thus does not cause an ignition problem, which occurs in the liquid electrolyte. The solid electrolyte also has the advantage of increasing the volume energy density by about 5 times compared to conventional batteries because a bipolar structure is possible.

However, the solid electrolyte used in the all-solid-state lithium-ion battery is very expensive, difficult to mass-produce, and is limited in controlling the particle size. These are the biggest obstacles to commercialization of all-solid-state lithium-ion batteries. Therefore, there is a need to develop a novel method of synthesizing a solid electrolyte capable of overcoming these limitations.

SUMMARY OF THE DISCLOSURE

An objective of the present disclosure is to provide a method of easily manufacturing a solid electrolyte in a large amount.

Another objective of the present disclosure is to provide a method of manufacturing a solid electrolyte at very low cost.

The objectives of the present disclosure are not limited to the foregoing, and are able to be understood through the following description and to be realized by the methods described in the claims and combinations thereof.

An embodiment of the present disclosure provides a method of manufacturing a solid electrolyte. The method includes: preparing a starting material including a monomer lithium powder, a monomer sulfur powder, and a phosphorus compound; adding the starting material to a solvent and causing a reaction with stirring to provide a reaction product; drying the reaction product; and heat-treating the dried reaction product, in which the monomer lithium powder and the monomer sulfur powder are not soluble in the solvent.

The starting material may further include a lithium halogen compound LiX, wherein X is selected from the group consisting of Br, Cl, I, and combinations thereof.

The starting material may not include a lithium sulfur compound.

The weight ratio of the starting material and the solvent may be in a range of 1:20 to 1:50.

The reaction may be made to occur by causing a collision between powder with stirring in a state in which the monomer lithium powder and the monomer sulfur powder are not dissolved in the solvent.

The reaction may be carried out using a stirrer, and the stirrer may include a container in which a space accommodating a solvent and a starting material is formed, a stirring blade disposed inside the container, and a stirring rod connected to the stirring blade and extending in a longitudinal direction of the container.

The reaction may be made to occur by inducing a collision or contact between components of the starting material in the solvent due to rotational force of the stirring blade by rotating the stirring rod.

The drying may be performed in a vacuum atmosphere at a temperature in a range of 25° C. to 250° C. for 5 hours to 15 hours.

The drying may be performed in a vacuum atmosphere through first drying at a temperature ranging from 25° C. to lower than 50° C. for 1 hour to 3 hours, second drying at a temperature ranging from 50° C. to lower than 100° C. for 1 hour to 3 hours, third drying at a temperature ranging from 100° C. to lower than 150° C. for 1 hour to 3 hours, fourth drying at a temperature ranging from 150° C. to lower than 200° C. for 1 hour to 3 hours, and fifth drying at a temperature ranging from 200° C. to 250° C. for 1 hour to 3 hours.

The first drying to the fifth drying may be performed by continuously or non-continuously raising the temperature from 25° C. to a temperature within a range of 200° C. to 250° C.

The heat-treating may be performed at a temperature in a range of 400° C. to 600° C. for 1 hour to 5 hours.

The solid electrolyte may be crystalline.

According to the present disclosure, it is possible to easily manufacture a solid electrolyte in a large amount, which can be of great help in providing price competitiveness.

According to the present disclosure, it is possible to manufacture a solid electrolyte having various compositions.

The effects of the present disclosure are not limited to the foregoing and should be understood to include all effects that can be reasonably anticipated from the following description.

DESCRIPTION OF SPECIFIC EMBODIMENTS

Figure 1:
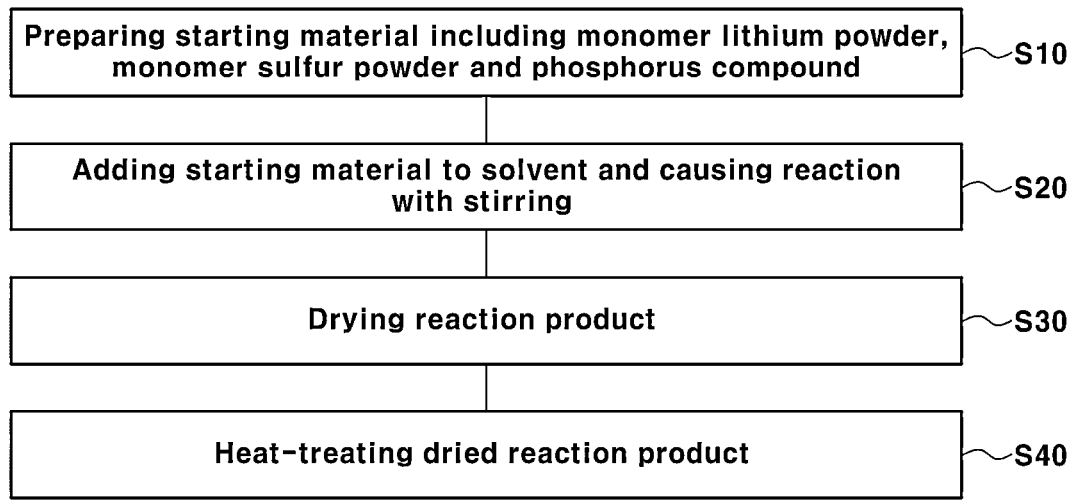
FIG. 1 is a flowchart showing an example of a process of manufacturing a solid electrolyte according to the present disclosure.

The above and other objectives, features, and advantages of the present disclosure may be understood from the following embodiments taken in conjunction with the accompanying drawings. However, the present disclosure is not limited to the embodiments disclosed herein and may be modified into different forms. These embodiments are provided to thoroughly explain the disclosure and to sufficiently transfer the spirit of the present disclosure to those skilled in the art.

Throughout the drawings, the same reference numerals refer to the same or like elements. For the sake of clarity of the present disclosure, the dimensions of structures are depicted as being larger than the actual sizes thereof. Although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

The terms "comprise", "include", "have", etc., when used in this specification, specify the presence of stated features, integers, acts, operations, elements, components, or combinations thereof, but do not preclude the presence or addition of one or more other features, integers, acts, operations, elements, components, or combinations thereof. Also, when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 is a flowchart showing the process of manufacturing a solid electrolyte according to the present disclosure. The method of manufacturing a solid electrolyte includes: preparing a starting material including a monomer lithium powder, a monomer sulfur powder, and a phosphorus compound (S10); adding the starting material to a solvent and causing a reaction with stirring (S20); drying the reaction product (S30); and heat-treating the dried reaction product (S40).

These acts are described in detail below.

The starting material may include a monomer lithium powder, a monomer sulfur powder, and a phosphorus compound, and optionally, may further include a lithium halogen compound LiX, wherein X is selected from the group consisting of Br, Cl, I, and combinations thereof.

A conventional method of manufacturing a solid electrolyte through a dry milling process involves a very complicated procedure, including placing a starting material and balls in a glove box, pulverizing the starting material for 48 hours or more and removing the balls to obtain a powder, followed by heat treatment.

In addition, wet milling is also performed in a manner in which the starting material is dissolved in a solvent and then allowed to react with stirring for a long time.

Unlike the conventional manufacturing method described above, the present disclosure is characterized in that a starting material that is not soluble in a solvent is used and a reaction is made to occur by causing a collision between the components of the starting material through stirring, wherein the components of the starting material are present in a solid state in the solvent. Specifically, a lithium sulfur compound is conventionally dissolved in a solvent to react with phosphorus pentoxide, but a monomer lithium powder and a monomer sulfur powder, which are not soluble in a solvent, are used in the present disclosure and stirred and collide with each other to cause a reaction. Compared to the conventional method, mechanical milling is improved, so the starting material may be more evenly and finely pulverized.

The weight ratio of the starting material and the solvent may be in a range of 1:20 to 1:50. Conventional wet milling functions to pulverize the starting material in the state of having a viscosity similar to that of slurry, and in the present disclosure, the starting material is stirred in the state of a kind of solution. When the weight ratio of the starting material and the solvent falls within the above range, the components of the starting material may come into contact with each other as desired upon stirring.

The solvent may include at least one solvent selected from the group consisting of ethanol, propanol, butanol, dimethyl carbonate, ethyl acetate, tetrahydrofuran, 1,2-dimethoxyethane, propylene glycol dimethyl ether, acetonitrile, and combinations thereof.

Figure 2:
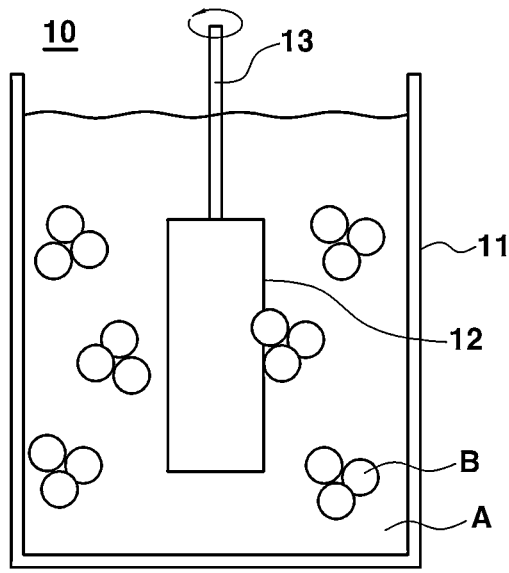
FIG. 2 schematically shows an example of a stirrer according to the present disclosure.

The reaction of the starting material may be carried out using a stirrer. FIG. 2 schematically shows the stirrer. The stirrer 10 may include a container 11 in which a space accommodating a solvent A and a starting material B is formed. The stirrer 10 may also include a stirring blade 12 disposed inside the container 11. The stirrer 10 may also include a stirring rod 13 connected to the stirring blade 12 and extending in the longitudinal direction of the container 11.

Here, a reaction may be made to occur by inducing a collision or contact between the components of the starting material B in the solvent A due to the rotational force of the stirring blade 12 by rotating the stirring rod 13.

The rate of rotation of the stirring blade 12 and the stirring rod 13 is not particularly limited. For example, the stirrer may operate at a rotation rate sufficient to allow mutual contact in the state in which the starting material B is evenly dispersed in the solvent A. The rotation rate may be appropriately adjusted depending on the size of the stirrer 10, the weight ratio of the solvent A and the starting material B, etc.

Thereafter, the reaction product may be dried, thus removing the solvent.

In an embodiment thereof, the reaction product may be dried in a vacuum atmosphere at a temperature of 25° C. to 250° C. for 5 hours to 15 hours, thus removing the solvent. If the drying conditions are less than 25° C. and/or 5 hours, the solvent may not be sufficiently removed, and the reaction between raw materials may not be sufficient. On the other hand, if the drying conditions exceed 250° C. and/or 15 hours, raw materials, particularly phosphorus sulfide, may be degraded.

In another embodiment thereof, the reaction product may be dried in a vacuum atmosphere through continuous two or more drying acts under different temperature conditions. Specifically, first drying at a temperature ranging from 25° C. to lower than 50° C. for 1 hour to 3 hours, second drying at a temperature ranging from 50° C. to lower than 100° C. for 1 hour to 3 hours, third drying at a temperature ranging from 100° C. to lower than 150° C. for 1 hour to 3 hours, fourth drying at a temperature ranging from 150° C. to lower than 200° C. for 1 hour to 3 hours, and fifth drying at a temperature ranging from 200° C. to 250° C. for 1 hour to 3 hours may be performed.

Here, the temperature conditions for the first drying to the fifth drying may be set such that the temperature is continuously or non-continuously raised from 25° C. to a temperature within the range of 200° C. to 250° C. For example, non-continuous drying may be performed in a manner in which, upon the first drying at 25° C., the second drying at 50° C., the third drying at 100° C., the fourth drying at 150° C., and the fifth drying at 200° C., the temperature may be raised as quickly as possible when moving from any one act to the next act. On the other hand, continuous drying may be performed in a manner in which the temperature is slowly raised from 25° C. over a set period of time within the range of 1 hour to 3 hours until it reaches 50° C. (first drying), the temperature is slowly raised again from 50° C. over a set period of time within the range of 1 hour to 3 hours until it reaches 100° C. (second drying), and the like. Continuous or non-continuous heating conditions may be appropriately adjusted depending on the set drying time.

Finally, the dried reaction product may be heat-treated, thus crystallizing a solid electrolyte.

For the heat treatment, the dried reaction product may be heat-treated to a temperature in a range of 400° C. to 600° C. for 1 hour to 5 hours. For example, the heat treatment may be performed in a manner in which the temperature is raised from room temperature to 150° C. at a rate of 2.5° C./min to 10° C./min, to 250° C. at a rate of 2.5° C./min to 5° C./min, to 400° C. at a rate of 1° C./min to 2.5° C./min, and to 550° C. at a rate of 1° C./min.

If the heat treatment conditions are less than 400° C. and/or 1 hour, the crystal may not sufficiently grow. On the other hand, if the heat treatment conditions exceed 600° C. and/or 5 hours, the solid electrolyte may be denatured and thus ionic conductivity may decrease, which is undesirable.

A better understanding of the present disclosure may be obtained through the following examples and comparative examples. However, these examples are merely set forth to illustrate the present disclosure and are not to be construed as limiting the scope of the present disclosure.

Example 1

In order to synthesize a solid electrolyte having a composition of $Li_3PS_4$, a starting material including 0.578 g of a monomer lithium powder (made by Sigma Aldrich), 1.336 g of a monomer sulfur powder (made by Sigma Aldrich), and 3.086 g of a phosphorus pentasulfide ($P_2S_5$) powder (made by Sigma Aldrich) was prepared. The starting material was placed in a stirrer containing 100 g of a tetrahydrofuran solvent. The stirrer was operated, and the starting material was stirred, thus synthesizing a solid electrolyte.

Thereafter, the reaction product was dried at about 200° C. for about 5 hours in a vacuum atmosphere, thereby removing the solvent remaining therein.

The dried reaction product was heat-treated at about 550° C. for about 5 hours, thereby obtaining a solid electrolyte having crystallinity.

Figure 3A:
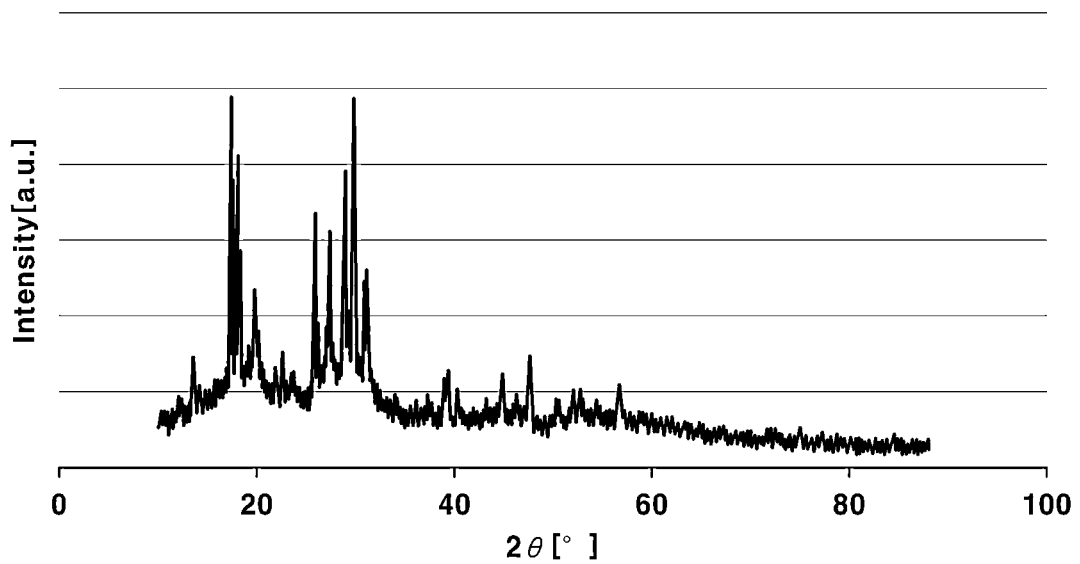
FIG. 3A shows the results of X-ray diffraction (XRD) analysis on the solid electrolyte of Example 1.

FIG. 3A shows the results of XRD analysis on the solid electrolyte of Example 1. With reference thereto, it can be seen that the solid electrolyte shows the peak of the $Li_3PS_4$ crystal phase.

Example 2

In order to synthesize a solid electrolyte having a composition of $Li_7P_3S_{11}$, a starting material including 0.491 g of a monomer lithium powder (made by Sigma Aldrich), 1.135 g of a monomer sulfur powder (made by Sigma Aldrich), and 3.373 g of a phosphorus pentasulfide ($P_2S_5$) powder (made by Sigma Aldrich) was prepared.

A solid electrolyte was synthesized in the same manner as in Example 1, except for the differences in the starting material composition described above.

Figure 3B:
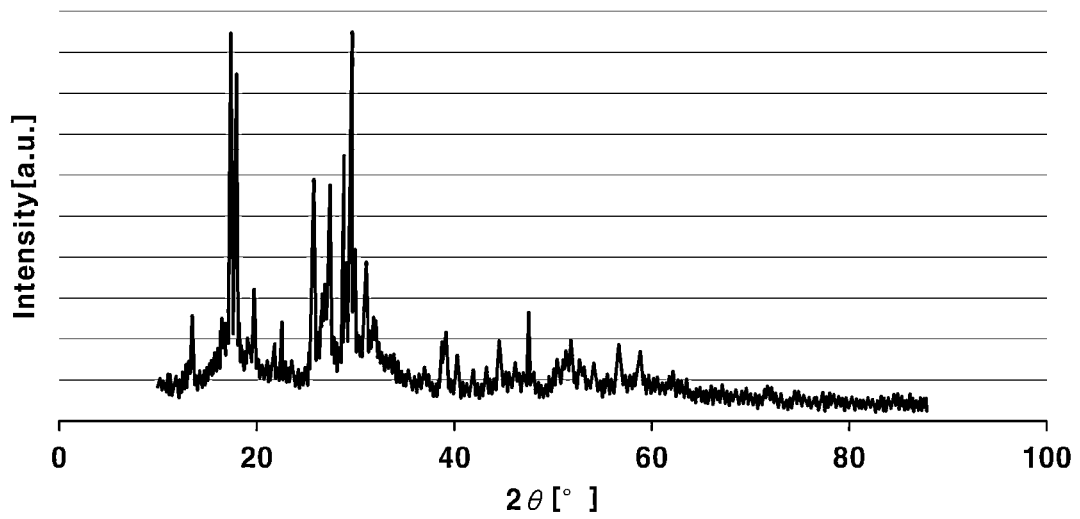
FIG. 3B shows the results of XRD analysis on the solid electrolyte of Example 2.

FIG. 3B shows the results of XRD analysis on the solid electrolyte of Example 2. With reference thereto, it can be seen that the solid electrolyte shows the peak of the $Li_7P_3S_{11}$ crystal phase.

Example 3

In order to synthesize a solid electrolyte having a composition of $Li_6PS_5Br$, a starting material including 0.554 g of a monomer lithium powder (made by Sigma Aldrich), 1.281 g of a monomer sulfur powder (made by Sigma Aldrich), 1.775 g of a phosphorus pentasulfide ($P_2S_5$) powder (made by Sigma Aldrich) and 1.389 g of lithium bromide (LiBr) was prepared.

A solid electrolyte was synthesized in the same manner as in Example 1, except for the differences in the starting material composition described above.

Figure 3C:
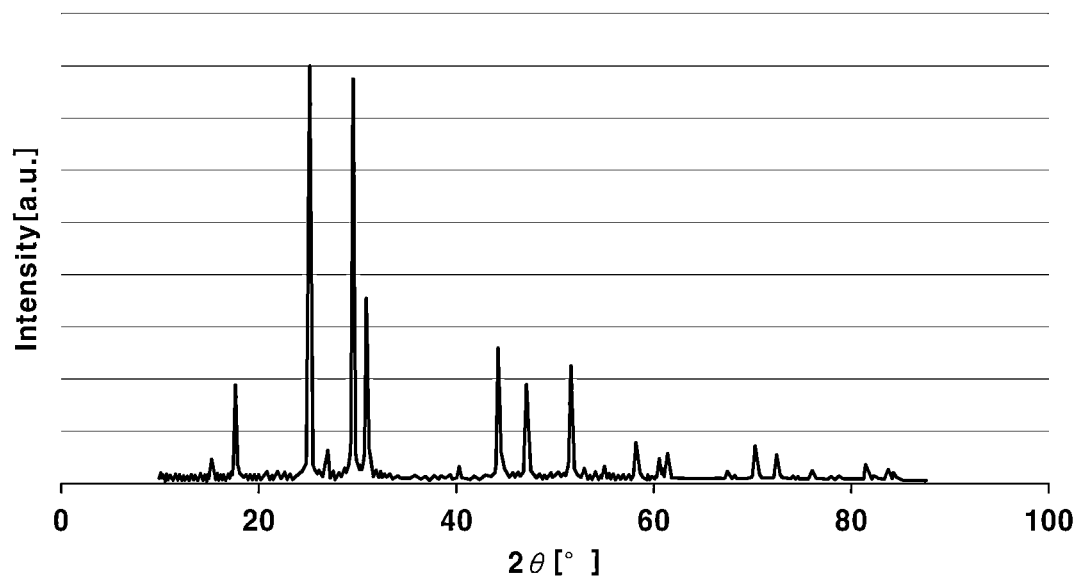
FIG. 3C shows the results of XRD analysis on the solid electrolyte of Example 3.

FIG. 3C shows the results of XRD analysis on the solid electrolyte of Example 3. With reference thereto, it can be seen that the solid electrolyte shows the peak of the $Li_6PS_5Br$ crystal phase.

Test Example

The lithium ionic conductivity of the solid electrolyte of each of Examples 1 to 3 was measured.

Each solid electrolyte was made into a green compact (a diameter of 13 mm and a thickness of 0.6 mm). An alternating-current potential of 10 mV was applied to the green compact, after which a frequency sweep of $1 \times 10^6$ to 100 Hz was performed to measure the impedance value, thereby determining the lithium ionic conductivity.

The results thereof are shown in Table 1 below.

TABLE 1

| Classification | Composition | Lithium ionic conductivity [S/cm] |
| --- | --- | --- |
| Example 1 | $Li_3PS_4$ | $0.5 \times 10^{-3}$ |
| Example 2 | $Li_7P_3S_{11}$ | $0.8 \times 10^{-3}$ |
| Example 3 | $Li_6PS_5Br$ | $1.0 \times 10^{-3}$ |

The test examples and examples of the present disclosure have been described in detail above, but the scope of the present disclosure is not limited to the test examples and examples described above. Various modifications and improvements capable of being devised by those skilled in the art using the basic concept of the present disclosure defined in the following claims also fall within the scope of the present disclosure.

What is claimed is:

1. A method of manufacturing a solid electrolyte, the method comprising:
    preparing a starting material comprising a lithium powder, a sulfur powder, and a phosphorus compound;
    adding the starting material to a solvent and causing a reaction with stirring to provide a reaction product;
    drying the reaction product; and
    heat-treating the dried reaction product to provide the solid electrolyte,
    wherein the lithium powder and the sulfur powder are not soluble in the solvent,
    wherein the reaction is carried out using a stirrer,
    wherein the stirrer includes
        a container in which a space accommodating the solvent and the starting material is formed,
        a stirring blade disposed inside the container, and
        a stirring rod connected to the stirring blade and extending in a longitudinal direction of the container,
    wherein the reaction occurs by inducing a collision or contact between components of the starting material in the solvent due to a rotational force of the stirring blade by rotating the stirring rod, and
    wherein a weight ratio of the starting material and the solvent is in a range of 1:20-1:50.

2. The method of claim 1, wherein the starting material further comprises a lithium halogen compound LiX,
    wherein X is selected from the group consisting of Br, Cl, I, and combinations thereof.

3. The method of claim 1, wherein the starting material does not comprise a lithium sulfur compound.

4. The method of claim 1, wherein the reaction occurs by causing a collision between powder with stirring in a state in which the lithium powder and the sulfur powder are not dissolved in the solvent.

5. The method of claim 1, wherein the drying is performed in a vacuum atmosphere at a temperature in a range of 25° C. to 250° C. for 5 hours to 15 hours.

6. The method of claim 1, wherein the drying is performed in a vacuum atmosphere through:
    first drying at a temperature ranging from 25° C. to lower than 50° C. for 1 hour to 3 hours;
    second drying at a temperature ranging from 50° C. to lower than 100° C. for 1 hour to 3 hours;
    third drying at a temperature ranging from 100° C. to lower than 150° C. for 1 hour to 3 hours;
    fourth drying at a temperature ranging from 150° C. to lower than 200° C. for 1 hour to 3 hours; and
    fifth drying at a temperature ranging from 200° C. to 250° C. for 1 hour to 3 hours.

7. The method of claim 6, wherein the first drying to the fifth drying is performed by raising the temperature from 25° C. to a temperature within a range of 200° C. to 250° C.

8. The method of claim 1, wherein the heat-treating is performed in a range of 400° C. to 600° C. for 1 hour to 5 hours.

9. The method of claim 1, wherein the solid electrolyte is crystalline.

* * * * *